(12) United States Patent
Huettlin

(10) Patent No.: US 9,399,948 B2
(45) Date of Patent: Jul. 26, 2016

(54) AGGREGATE, IN PARTICULAR A HYBRID ENGINE, ELECTRICAL POWER GENERATOR OR COMPRESSOR

(71) Applicant: Herbert Huettlin, Steinen (DE)

(72) Inventor: Herbert Huettlin, Steinen (DE)

( * ) Notice: Subject to any disclaimer, the term of this patent is extended or adjusted under 35 U.S.C. 154(b) by 744 days.

(21) Appl. No.: 13/683,874

(22) Filed: Nov. 21, 2012

(65) Prior Publication Data

US 2013/0084196 A1 Apr. 4, 2013

Related U.S. Application Data

(63) Continuation of application No. PCT/EP2011/000418, filed on Jan. 31, 2011.

(30) Foreign Application Priority Data

May 25, 2010 (DE) .......................... 10 2010 022 012

(51) Int. Cl.
*F02B 53/14* (2006.01)
*F02B 63/04* (2006.01)
(Continued)

(52) U.S. Cl.
CPC ............... *F02B 63/04* (2013.01); *B60L 11/126* (2013.01); *B60L 11/1853* (2013.01); *B60L 11/1864* (2013.01); *F01C 9/002* (2013.01); *F01C 13/00* (2013.01); *F02B 53/00* (2013.01); *F02B 53/14* (2013.01); *F02B 55/00* (2013.01); *F04B 53/00* (2013.01); *F04C 21/002* (2013.01); *F04C 23/02* (2013.01); *H02K 7/00* (2013.01);
(Continued)

(58) Field of Classification Search
CPC .... F02B 63/042; F02B 53/14; F04C 2240/40; F04C 2240/45; H02K 7/1815
See application file for complete search history.

(56) References Cited

U.S. PATENT DOCUMENTS

| 3,602,203 A | 8/1971 | Mowry |
| 7,681,549 B2 | 3/2010 | Huettlin |

(Continued)

FOREIGN PATENT DOCUMENTS

| DE | 102005023721 B3 | 8/2006 |
| DE | 102005062529 A1 | 6/2007 |

(Continued)

OTHER PUBLICATIONS

International Preliminary Report on Patentability and Written Opinion of the International Searching Authority, Application No. PCT/EP2011/000418, Issued: Nov. 27, 2012, 6 pages.
(Continued)

*Primary Examiner* — F. Daniel Lopez
(74) *Attorney, Agent, or Firm* — St. Onge Steward Johnston & Reens, LLC

(57) ABSTRACT

An aggregate, in particular a hybrid engine, electrical power generator or compressor, comprises a housing in which are arranged a piston motor part and an electric motor part, wherein the piston motor part has a first piston with a first end face and at least one second piston with a second end face, wherein the first piston and the at least one second piston perform reciprocating motions, wherein between the first end face and the second end face is provided a working chamber for a working medium, which chamber is periodically reduced and enlarged because of the reciprocating motions of the pistons, and wherein the electric motor part has an annular rotor which can rotate in the housing about a rotation axis that is fixed relative to the housing. The rotor surrounds the piston motor part.

10 Claims, 17 Drawing Sheets

(51) Int. Cl.
  *F01C 9/00* (2006.01)
  *F01C 13/00* (2006.01)
  *F04C 21/00* (2006.01)
  *F04C 23/02* (2006.01)
  *H02K 7/00* (2006.01)
  *H02K 7/14* (2006.01)
  *H02K 7/18* (2006.01)
  *F04B 53/00* (2006.01)
  *B60L 11/12* (2006.01)
  *B60L 11/18* (2006.01)
  *F02B 53/00* (2006.01)
  *F02B 55/00* (2006.01)

(52) U.S. Cl.
  CPC ............... *H02K 7/14* (2013.01); *H02K 7/1807* (2013.01); *B60L 2220/44* (2013.01); *F04C 2240/45* (2013.01); *Y02T 10/17* (2013.01); *Y02T 10/6217* (2013.01); *Y02T 10/641* (2013.01); *Y02T 10/7005* (2013.01); *Y02T 10/7061* (2013.01); *Y02T 10/7077* (2013.01)

(56) References Cited

U.S. PATENT DOCUMENTS

| | | |
|---|---|---|
| 8,141,475 B2 | 3/2012 | Huettlin |
| 2005/0201884 A1 | 9/2005 | Dreiman |
| 2008/0008515 A1 | 1/2008 | Yamamoto et al. |
| 2008/0041225 A1 | 2/2008 | Huettlin |
| 2008/0245345 A1 | 10/2008 | Huettlin |
| 2009/0038581 A1 | 2/2009 | Huettlin |
| 2010/0269688 A1 | 10/2010 | Huettlin |

FOREIGN PATENT DOCUMENTS

| | | |
|---|---|---|
| DE | 102007054321 A1 | 5/2009 |
| DE | 102008012374 A1 | 9/2009 |
| GB | 2454360 A | 5/2009 |
| JP | S6217382 A | 1/1987 |
| JP | 2004528506 A | 9/2004 |
| JP | 2005526206 A | 9/2005 |
| JP | 2008531904 A | 8/2008 |
| JP | 2008232105 A | 10/2008 |
| JP | 2009519400 A2 | 5/2009 |
| JP | 2009527684 A | 7/2009 |
| SU | 1321837 A1 | 7/1987 |
| WO | 02079625 A1 | 10/2002 |
| WO | 2009056295 A1 | 5/2009 |
| WO | 2009138724 A2 | 11/2009 |
| WO | 2010010995 A2 | 1/2010 |
| WO | 2010125352 A1 | 11/2010 |

OTHER PUBLICATIONS

Examination Report From Japan, Application No. 2013-511554, Dispatch Date: Feb. 27, 2014, 10 pages.
State Intellectual Property Office of People's Republic of China, Application No. 201180025902.5, Issued: Apr. 3, 2014, 7 pages.
International Search Report, Application No. PCT/EP2011/000418, Completed: Feb. 28, 2012; Mailing Date: Mar. 6, 2012, 3 pages.
Notification of Reasons for Refusal, Application No. 2013511554, Dispatch Date: Jan. 22, 2015.

AGGREGATE, IN PARTICULAR A HYBRID ENGINE, ELECTRICAL POWER GENERATOR OR COMPRESSOR

BACKGROUND OF THE INVENTION

The invention relates to an aggregate, in particular a hybrid engine, electrical power generator or compressor.

Conventional hybrid drives normally combine a combustion engine and an electric motor. Such hybrid drives which are today gaining in importance, have the advantage that for example in urban traffic the low-emission electric drive can be used, while in cross-country traffic and on motorways the combustion engine is used.

Conventional hybrid drives are based on combustion engines formed as reciprocating piston engines with linearly mobile pistons, wherein the pistons are arranged for example in-line or in a V-shape. In a hybrid engine known from DE 10 2005 062 529 B4, the piston motor part, which serves as a combustion engine, is formed from two halves of a spherical engine with pistons revolving about a rotational axis in the housing, wherein the electric motor part is arranged between the two halves of the spherical engine. Although this known hybrid engine, in comparison with conventional hybrid drives, is constructed relatively short in the direction of the rotation axis of the rotor, because the electric motor part of the two half spherical engines is accommodated in a sandwich arrangement in a common housing, there is still the need for an even more compact construction of such a hybrid engine.

The aggregate of the present invention is not restricted to a hybrid engine but can also be designed solely as an electrical power generator or a compressor.

SUMMARY OF THE INVENTION

The invention is based on the object of refining an aggregate such that the aggregate is constructed short, in particular in the direction of the rotation axis of the rotor of the electric motor part.

According to an aspect, an aggregate is provided, comprising a housing, a piston motor part arranged in the housing, the piston motor part having a first piston having a first end face, and a second piston having a second end face, wherein the first piston and the second piston perform reciprocating motions, a working chamber for a working medium which is arranged between the first end face and the second end face, and which is periodically reduced and enlarged in size because of the reciprocating motions of the pistons, an electric motor part arranged in the housing, the electric motor part having an annular rotor which rotates in the housing about a rotation axis that is fixed relative to the housing, wherein the rotor surrounds the piston motor part.

The aggregate according to the invention therefore has a structure in which instead of an in-line arrangement of electric motor part and piston motor part, an interlinked arrangement of internal piston motor part and external electric motor part is provided, wherein again both the piston motor part and the electric motor part are accommodated in a common housing. The aggregate according to the assembly is therefore constructed axially substantially shorter than the known aggregate in the direction of the rotation axis of the rotor.

In the case that the aggregate according to the invention is designed as a hybrid engine, the piston motor part is designed as the combustion engine wherein a Carnot cycle takes place in the working chamber between the two end faces of the two pistons, for the intake and compression of a fuel-air mixture and for expansion and expulsion of the burned fuel-air mixture. The electric motor part of this hybrid engine, as will be described in more detail below, can serve as an electric motor drive for a vehicle when the combustion engine is stopped or as an electrical power generator when the combustion engine is running.

When designed as a hybrid engine, the aggregate according to the invention can be used in a motor vehicle.

In a further advantageous use, when designed as a hybrid engine, the aggregate according to the invention can be used in a wind power plant in order to generate electrical energy and compressed air simultaneously or alternately, wherein for this application the piston motor part works as a compressor.

In the case that the aggregate is designed solely as an electrical power generator, the piston motor part is formed as a combustion engine and serves to drive the electric motor part which then generates electrical energy which can be received by the aggregate via a cable in order for example to feed an electric motor in a vehicle or charge the batteries for the electric motor. Such an aggregate is also known as a range extender and serves to extend the range of a vehicle fitted with an electric motor by additionally putting into operation of the combustion engine providing electrical energy. The electric motor part also serves to start the combustion engine, i.e. as a starter motor, which also applies to the case described above of the design of the aggregate as a hybrid engine.

As well as the use of the aggregate according to the invention as an electrical power generator in a motor vehicle as described above, the aggregate according to the invention can also be used to supply energy in a building. In this case the piston motor part is used to generate electricity via the electric motor part, supplying the building with electrical power, while the waste heat from the piston motor part is used to heat the building. In conjunction with electric and thermal solar cells or collectors therefore a complete energy supply of a building can be achieved with the aggregate according to the invention.

In the case that the aggregate according to the invention is designed as a compressor, the electric motor part serves to drive the piston motor part, wherein then the piston motor part is designed not as a combustion engine but as a compressor, wherein in the working chamber a working medium, for example air taken in, is compressed and then expelled as a pressurized medium.

In a preferred refinement the first piston and the second piston can revolve together about the rotation axis and the reciprocating motion of the pistons is derived from the revolving motion about the rotation axis, wherein the first and the second piston are arranged in a piston cage which revolves with the pistons about the rotation axis and wherein the rotor is connected or can be coupled rotationally fixed with the piston cage.

In the simpler refinement in which the rotor of the electric motor part is connected rotationally fixed with the piston cage, the aggregate is suitable in particular as a pure electrical power generator, wherein both to start the piston motor part formed as a combustion engine and to drive the electric motor part with the combustion engine running, there is always a fixed coupling between the rotor of the electric motor part and the piston cage of the piston motor part.

In the alternative refinement in which the rotor of the electric motor part can be coupled rotationally fixed with the piston cage, the aggregate is advantageously suitable as a hybrid engine, because with the aggregate drive energy can be produced for a vehicle either via the piston motor part designed as the combustion engine or by the electric motor part functioning as an electric motor, independently of each other. Also the electric motor part serves as a starter for the piston motor part.

In connection with the refinement described above in which the rotor can be coupled rotationally fixed with the piston cage, the rotor can be coupled rotationally fixed with the piston cage preferably via a coupling, wherein when the coupling is opened, the rotor is decoupled from the piston cage. This refinement is advantageously suitable for use of the aggregate as a hybrid engine.

Such a coupling is preferably designed as a hydraulic coupling.

It is furthermore preferred if the rotor is connected with an output shaft.

This refinement is also advantageous for the design of the assembly as a hybrid engine as rotational energy from the rotor can be used by the electric motor part to drive a vehicle. When said coupling between the rotor and piston cage is closed and the drive energy to drive a vehicle is provided by the piston motor part designed as a combustion engine, the same output shaft serves to apply the rotation of the piston cage about the rotation axis as drive energy, while the rotor of the electric motor is also rotating and the electric motor part then runs in the manner of an alternator as an electrical power generator to generate electrical energy, for example to charge the vehicle battery.

In a further preferred refinement the reciprocating motions of the pistons are derived from their revolving motions by a curve element which has a control curve and surrounds the first and the second piston in the manner of a ring and does not revolve with the piston cage about the rotation axis, wherein the first piston and the second piston each have at least one running element which is guided along the control curve on revolution of the pistons about the rotation axis.

Alternatively to the refinement of the aggregate in which the reciprocating motions are derived from the revolving motions of the pistons about the rotation axis, in a further preferred refinement it is proposed that the first piston and the second piston do not revolve about the rotation axis, wherein the reciprocating motions of the pistons are derived from the revolving motion of a curve element about the rotation axis, which element comprises a control curve and surrounds the second piston in the manner of a ring, and wherein the rotor is connected or can be coupled rotationally fixed with the curve element.

Both refinements described above can also be achieved in a constructionally simple manner by the design of the aggregate according to the invention with the radially interlinked electric motor part and piston motor part.

In both refinements mentioned above it is furthermore preferred if the respective running element is configured as a ball, which is mounted freely rotatable in a respective ball socket on a respective back of the first and second piston facing away from the first and second end faces respectively.

The geometry of the arrangement of running element, ball socket on the back of the associated piston, and control curve of the curve element, is preferably selected such that when the balls run along the control curve they are not loaded by shear forces, in that the force line between the piston back, ball socket and control curve runs as vertically as possible to the ball socket base of the associated piston and centrally through the ball. As a result the respective ball can roll on the control curve lying centered in the ball socket.

In a further preferred refinement, the first piston has a third end face and the second piston has a fourth end face, wherein between the third end face and the fourth end face is provided a further working chamber for a fluid, which working chamber periodically reduces and enlarges in size because of the reciprocating motions of the first and second pistons.

In this refinement the aggregate according to the invention has as many pistons as the known hybrid engine, but in axially substantially shorter construction, since the piston motor part formed by the pistons is arranged on the inside of the electric motor part and surrounded thereby.

Here preferably the first piston has a first element having the first end face and a third element having the third end face, and the second piston has a second element having the second end face and a fourth element having the fourth end face, wherein the first and third elements are connected together to form the first piston, and the second and fourth elements are connected together to form the second piston so that the working chamber and the further working chamber are enlarged and reduced in size in opposition to each other.

In this refinement the first piston and the second piston form a double piston in each case.

In comparison with a design of four pistons as individual pistons, the advantage of this measure is that between the first and third elements of the first piston, and between the second and fourth elements of the second piston, there is a mutual dragging or entraining effect in the reciprocating motion.

In a further preferred refinement the reciprocating motions of the first or second pistons are pivoting motions about a pivot axis and the first piston and the second piston are held and mounted on a journal centered on the pivot axis.

This measure has the advantage that sliding friction of the pistons and hence the heat development from the reciprocating motions of the pistons can be reduced. This is advantageous in particular if the pistons not only perform the reciprocating motions but at the same time revolve about the rotation axis, whereby in this case in particular at high rotation speeds, greater centrifugal forces occurring do not increase the sliding friction of the pistons.

Further advantages and features arise from the description below and the accompanying drawing.

It is evident that the features cited above and to be explained below can be used not only in the combination given but also in other combinations or alone, without leaving the scope of the present invention.

BRIEF DESCRIPTION OF THE DRAWINGS

Exemplary embodiments of the invention are shown in the drawings and described in more detail below with reference thereto. In the drawings:

FIG. 6 shows a further embodiment of an aggregate in a configuration as a hybrid engine, wherein FIG. 6 shows the aggregate in a perspective view with closed housing;

FIG. 15 shows a further embodiment of a piston motor part as an alternative to the piston motor parts of the aggregates in FIGS. 1, 6 and 11, wherein FIG. 15 shows the piston motor part with the first half of a piston cage of the piston motor part removed;

DETAILED DESCRIPTION OF PREFERRED EXEMPLARY EMBODIMENTS

Figure 1:
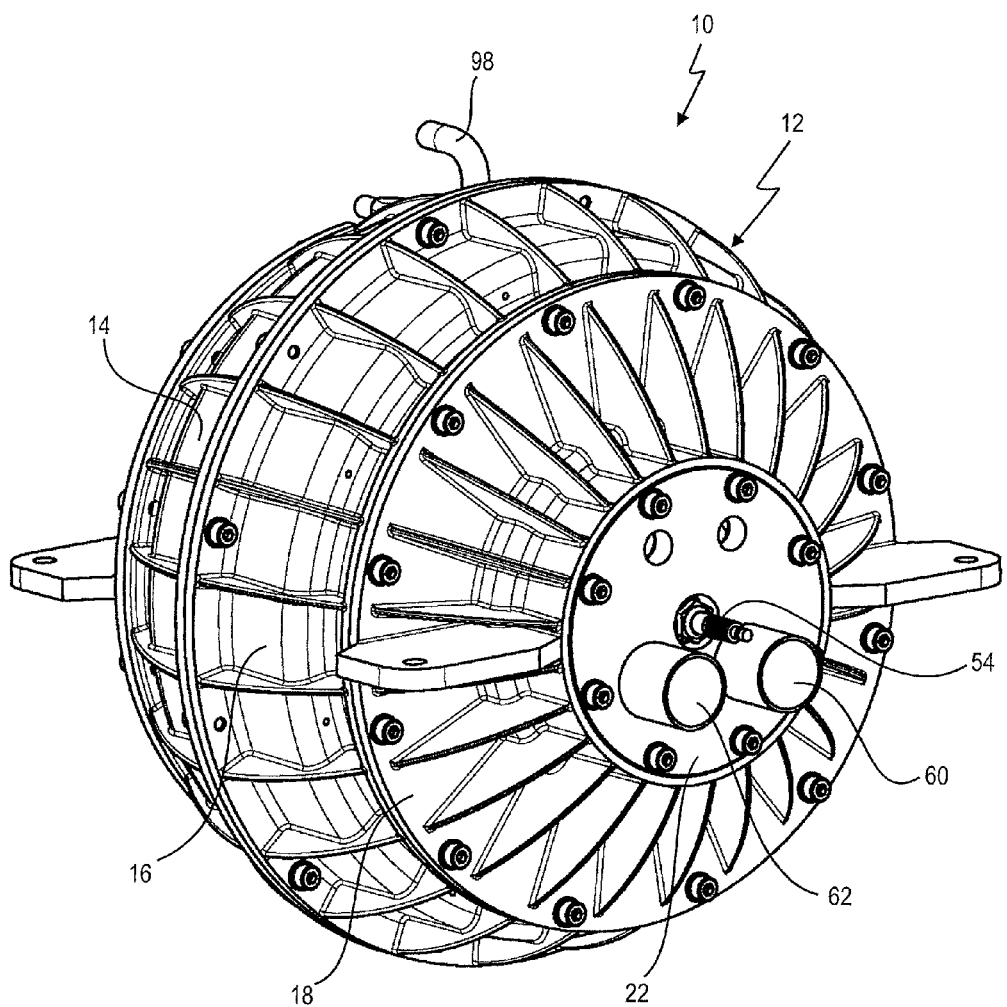
FIG. 1 shows a first embodiment of an aggregate in a configuration as an electrical power generator in a perspective view with closed housing.

FIGS. 1 to 4 show a first embodiment of an aggregate 10. The aggregate 10 in this embodiment is designed as an electrical power generator and, as will be described below, can be used in a vehicle drive as a so-called range extender.

The aggregate 10 has a housing 12 which comprises two cylindrical housing parts 14 and 16, two bottom parts 18 and 20, and two end covers 22 and 24.

Arranged in the housing 12 is an electric motor part 26 and a piston motor part 28.

The piston motor part 28 is first described in more detail below.

The piston motor part 28 has a total of two pistons, namely a first piston comprising piston elements 30 and 34, and a second piston comprising piston elements 32 and 36.

The first piston element 30 and the second piston element 32 have a first end face 38 and a second end face 40, which between them form a first working chamber 42 for a working medium.

Correspondingly the third piston element 34 and the fourth piston element 36 have a third end face 44 and a fourth end face 46 between which is arranged a second working chamber 48 for a working medium.

In operation of the piston motor part 28, the first piston element 30 and the second piston element 32 perform reciprocating motions in opposition to each other, wherein these motions are performed as pivoting motions about a pivot axis 50. Correspondingly the piston elements 34 and 36 perform reciprocating motions in opposition to each other, here also pivoting motions, about the same pivot axis 50.

The first piston element 30 is connected with the third piston element 34, here rigidly, to form the first piston, and the second piston element 32 and the fourth piston element 36 are connected together, also rigidly, to form the second piston.

Figure 2:
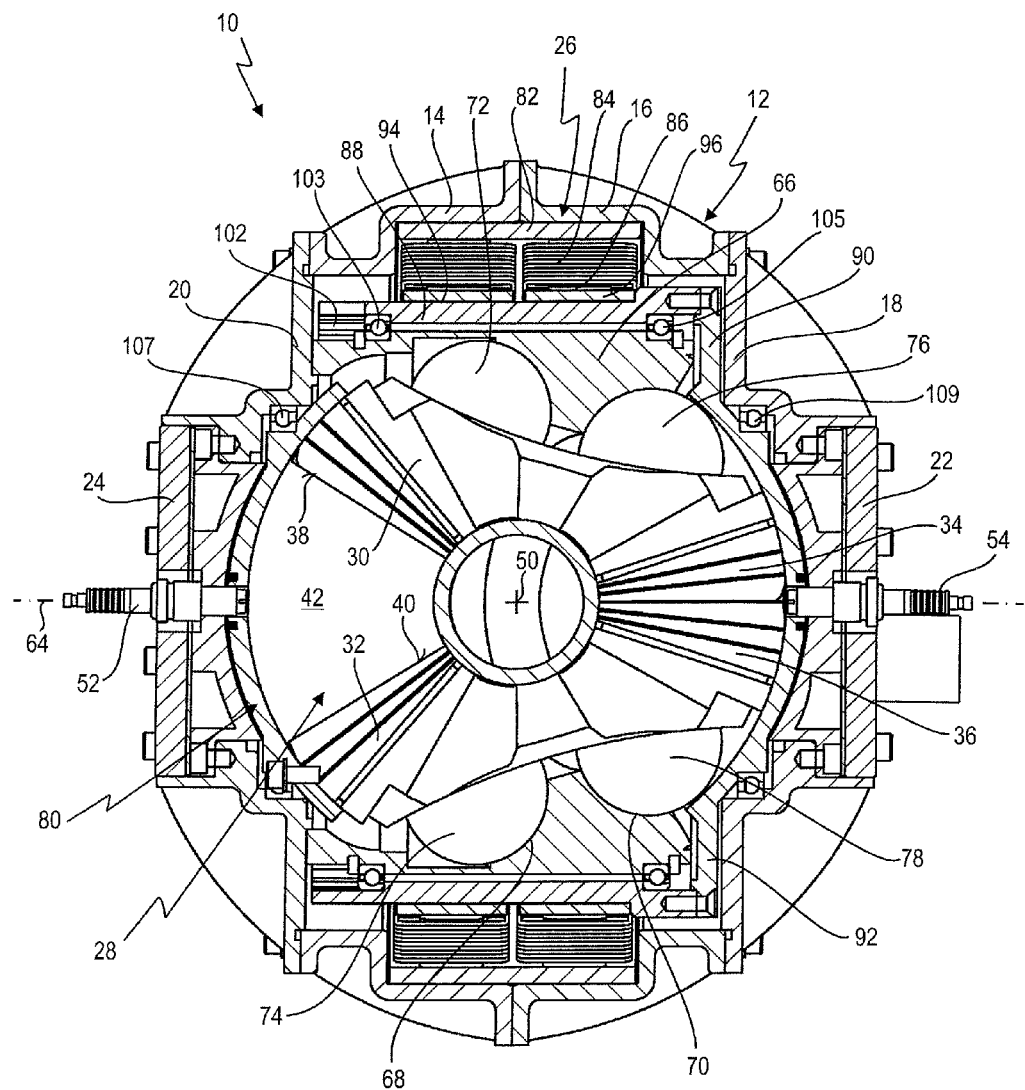
FIG. 2 shows the aggregate in FIG. 1 in a longitudinal section along a plane containing a rotation axis of a rotor of an electric motor part of the aggregate, wherein pistons of a piston motor part of the aggregate are shown in a first position.

As a result when the working chamber 42 enlarges in volume, the second working chamber 48 reduces in size, and vice versa. In FIG. 2, the first working chamber 42 is shown with maximum volume while the second working chamber 48 assumes its minimum volume, and in FIG. 4 the reverse case is shown i.e. in the position of pistons 30 to 36 in FIG. 4 the second working chamber 48 assumes its maximum volume while the first working chamber 42 assumes its minimum volume.

In the aggregate 10, the piston motor part 28 is formed as a combustion engine. In the working chambers 42 and 48 a Carnot cycle is carried out for intake and compression of the fuel-air mixture, and working and expulsion of the burned fuel-air mixture. Accordingly a spark or glow plug 52 and 54 is allocated to the working chambers 42 and 48. Also allocated to the first working chamber accordingly is a gas inlet 56 for fresh air and a gas outlet 58 for exhaust gas, and evidently a nozzle not shown in detail for the supply of fuel. A gas outlet 60 and a gas inlet 62 are allocated to the second working chamber 58 accordingly.

In operation of the piston motor part 28, the pistons revolve in the housing 12 about a rotation axis 64 fixed in relation to the housing, wherein the reciprocating motions of the pistons are derived from this revolving motion about the rotation axis 64.

In order to derive the reciprocating motions of the pistons from their revolving motions about the rotation axis 64, the piston motor part 28 has a curve element 66 which surrounds the pistons in the manner of a ring. The curve element 66 has two control curves, namely a first control curve 68 and a second control curve 70 which in the peripheral direction have corresponding contours about the rotation axis 64 to generate the reciprocating motions of the pistons, as evident from a comparison of FIGS. 2 to 4 which show the different positions of the pistons.

Each piston element 30 to 36 on its back facing away from the associated end face 38 to 46 has a running element in the form of a ball 72 (piston element 30), 74 (piston element 32), 76 (piston element 34) and 78 (piston element 36) (see FIGS. 11 to 14). The balls 72 to 78 are arranged freely rotatable in corresponding ball sockets, not shown in more detail, on each of the piston elements 30 to 36. On revolution of the pistons about the rotation axis 34, the balls 72 to 78 run along the control curves 68 to 70 and thus generate the reciprocating motions of the pistons in relation to the pivot axis 50. The pivot axis 50, which here means a geometric axis, which also holds for the rotation axis 64, also rotates about the rotation axis 64.

Figure 3:
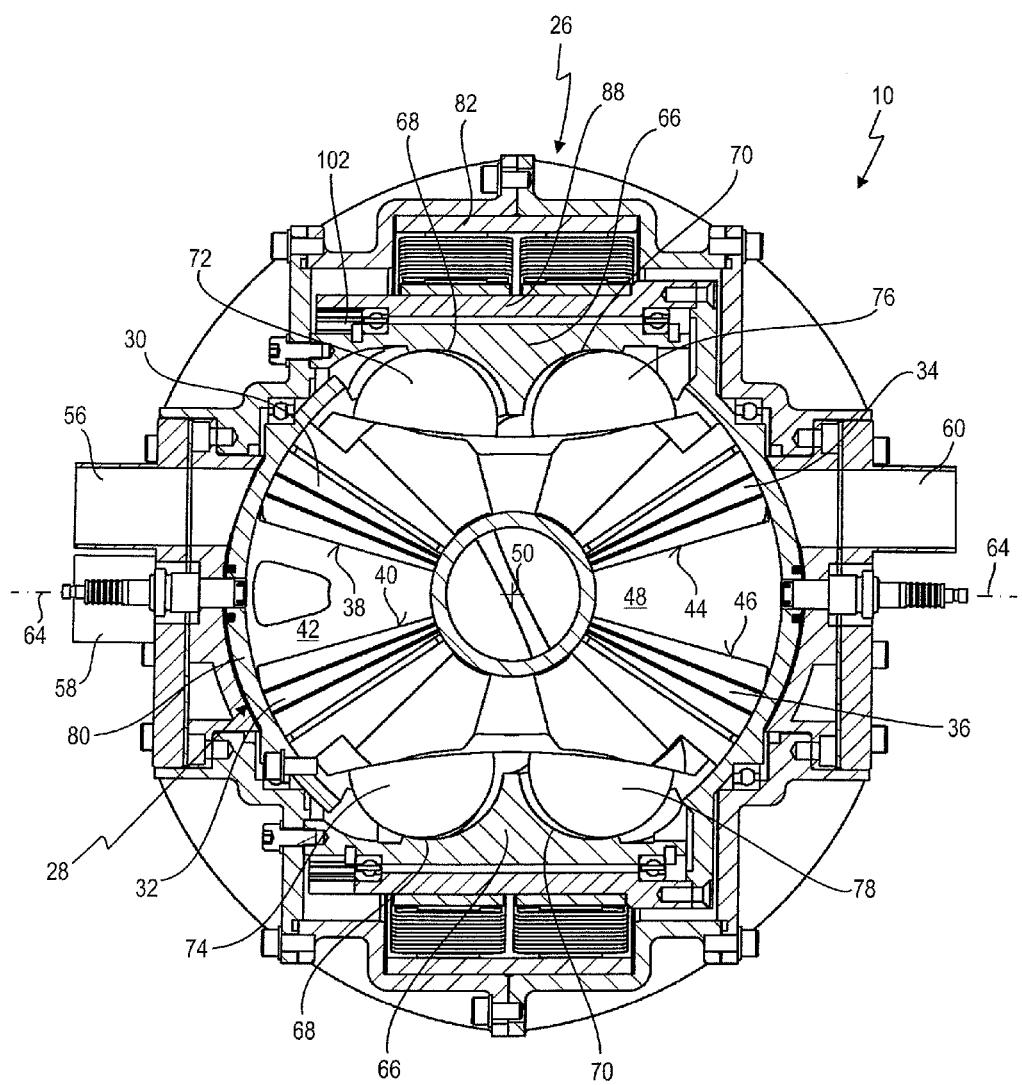
FIG. 3 shows the aggregate in FIGS. 1 and 2 also in a section along a plane containing the rotation axis of the rotor of the electric motor part, wherein the pistons are shown in a further position.
Figure 4:
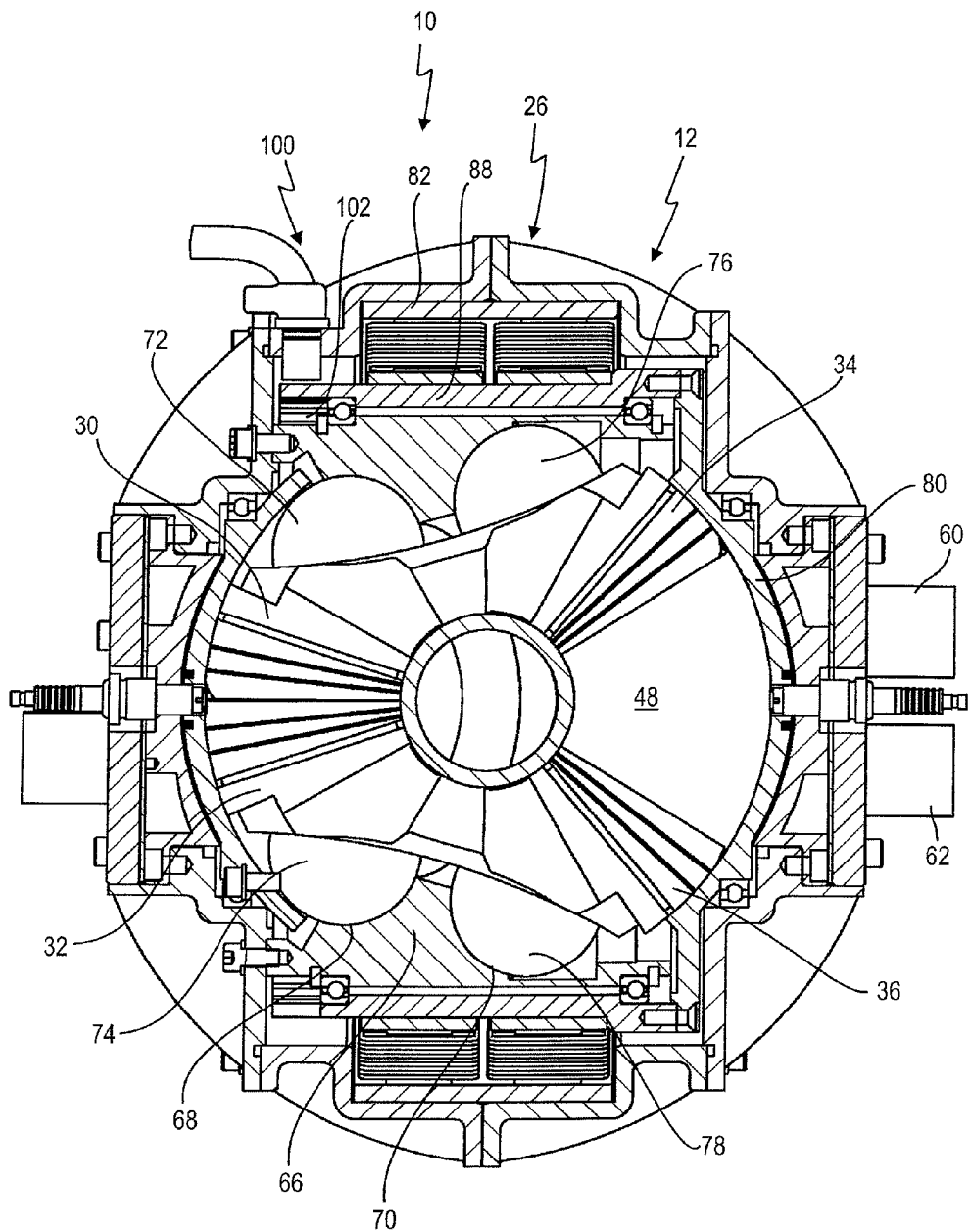
FIG. 4 shows the aggregate in FIGS. 1 to 3, also in a section along a plane containing the rotation axis of the rotor of the electric motor part, wherein the pistons are shown in yet a further position.

For easier understanding of the drawings, piston elements 30 to 36 in FIGS. 2 to 4 are each shown in the drawing plane and the housing 12 is shown in different rotary positions in relation to the rotation axis 64. It is evident however that it is not the housing 12 which revolves about the rotation axis 64, but the pistons.

As already stated, FIG. 2 shows a position of the pistons in which the working chamber 42 assumes its maximum value (top dead center position of pistons 30 and 32), while the second working chamber 48 assumes its minimum volume (bottom dead center position of pistons 34 and 36), whereas in FIG. 3 a position of the pistons is shown in which piston elements 30 and 32, starting from FIG. 2, have moved towards each other and piston elements 34 and 36 have moved away from each other, and wherein FIG. 4 shows the position of the pistons in which the first working chamber 42 now assumes its minimum volume and the second working chamber 48 its maximum volume.

The piston motor part 28 furthermore has a piston cage 80 in which the piston elements 30 to 36 are mounted in sliding fashion so that they can perform their reciprocating motions in relation to the pivot axis 50 and which revolves about the rotation axis 64 in the housing together with the pistons.

Now the electric motor part 26 of the aggregate 10 will be described in more detail.

The electric motor part 26 has a stator 82 with windings 84 and magnet cores 86. The stator 82 with windings 84 and magnet core 86 is arranged in the housing 12 fixed in relation to the housing.

The electric motor part 26 furthermore has a rotor 88 which revolves in the housing 12 about the rotation axis 64 together with the piston cage 80 and the pistons when the piston motor part 28 of the aggregate 10 is in operation.

Here the rotor 88 surrounds the piston motor part 28 in the manner of a ring, whereby the piston motor part 28 is arranged inside the rotor 88 of the electric motor part 26.

The rotor 88 is here connected rotationally fixed with the piston cage 80 and namely via protrusions 90 and 92 radial to rotation axis 64, which are provided on the axial side of the bottom part 18 on the piston cage 80.

The rotor 88 and the piston cage 80 thus together form an assembly which revolves about the rotation axis 64 when the aggregate 10 is in operation.

The rotor 88 has radially external magnetic rings 96 which each carry a number of individual magnets and cooperate accordingly with the magnet cores 86 of the stator 82.

To start the piston motor part 28 formed as a combustion engine, the electric motor part 26 is supplied with electrical energy from the outside (cable 98) in order to set the rotor 88 in rotation about the rotation axis 64. This rotation then starts the combustion engine (piston motor part 28) and after the combustion engine has started, the electric motor part 26 serves as a generator to provide electrical energy.

According to FIG. 1 the aggregate 10 is equipped accordingly with a cable 98 via which the electrical energy can be taken from the electric motor part 26.

The rotor 88 furthermore has a control sensor 100 (see FIG. 4) which cooperates with a "60-2" toothed control wheel 102 for the engine management of the piston motor part 28.

The rotor 88 is furthermore mounted via ring ball bearings 103 and 105 on the curve element 66 and the piston cage 80 is mounted via ring ball bearings 107 and 109 on the housing 12.

Figure 5:
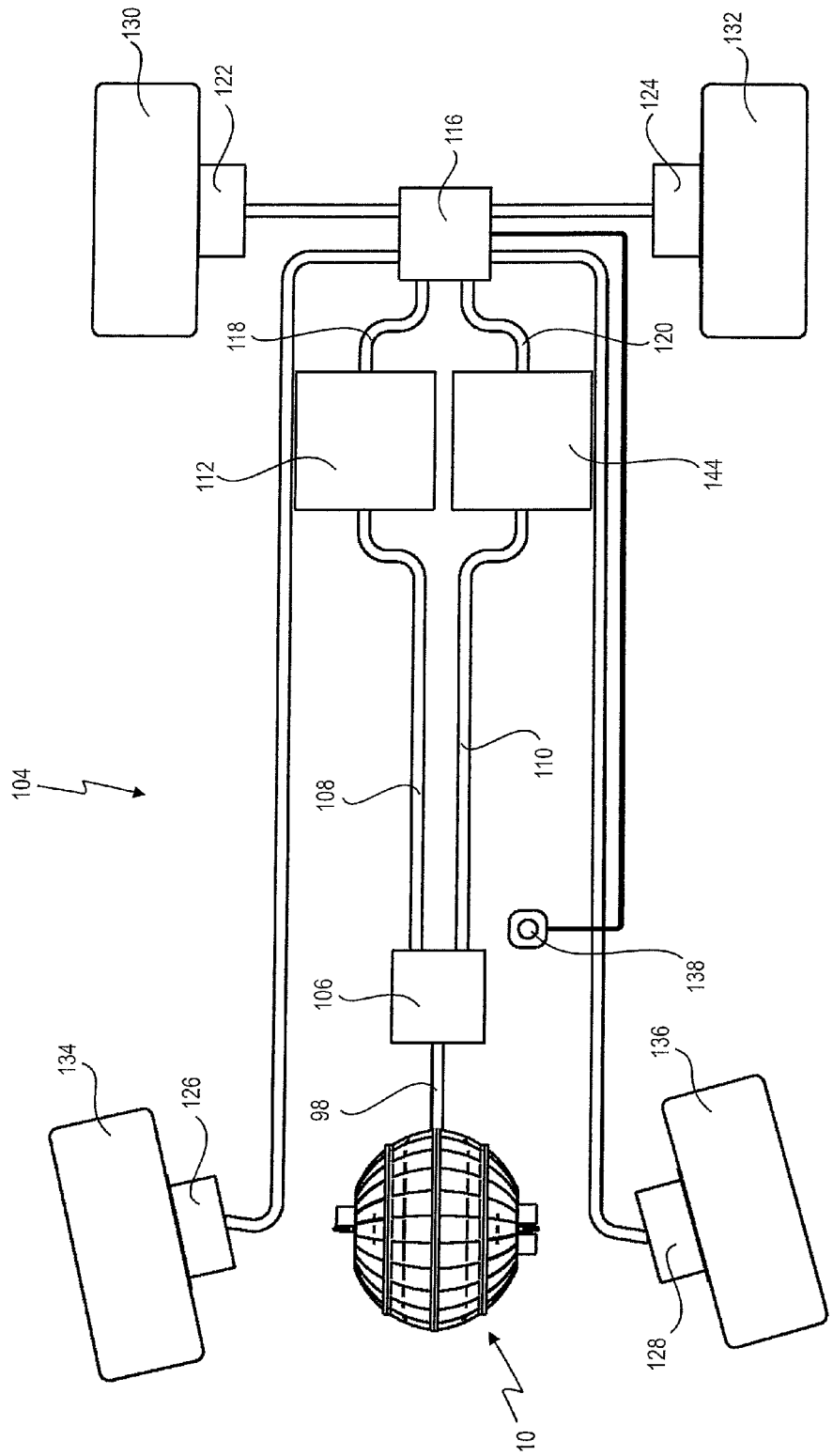
FIG. 5 shows a diagrammatic depiction of an example of the installation of the aggregate in FIG. 1 in a chassis of a vehicle.
Figure 6:
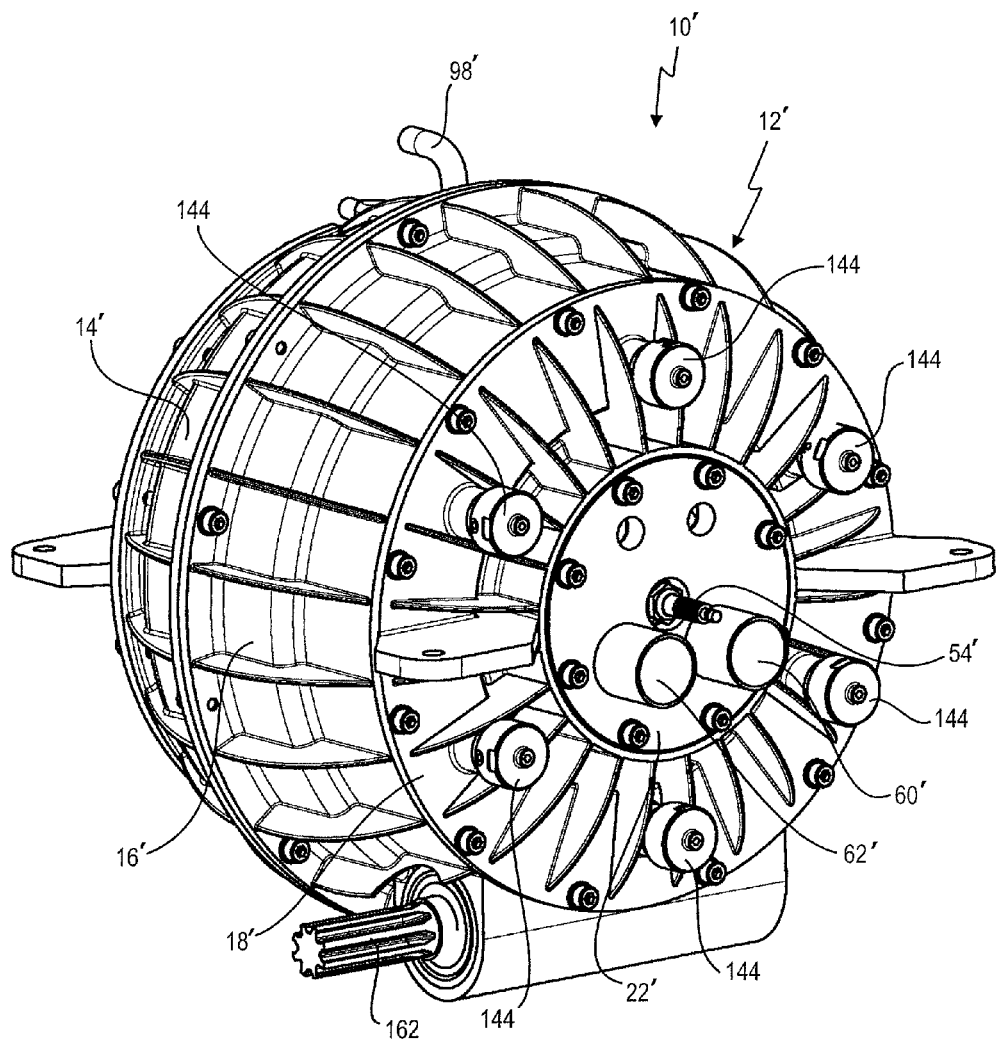

FIG. 5 shows the installation position of the aggregate 10 in a chassis 104 of a vehicle. The aggregate is connected via the cable 98 with a first regulator 106 which in turn is connected via cables 108, 110 with accumulators 112, 114. The accumulators 112 and 114 are connected with the second regulator 116 via cables 118, 120, wherein the second regulator 116 is connected with the wheel hub motors 122, 124, 126, 128 to drive wheels 130, 132, 134, 136. The aggregate 10 serves to charge the accumulators 112, 114 in order to extend the operating duration of the wheel hub motors 122 to 128. The aggregate 10 thus in this case serves as a range extender.

Via a control element 138 in the passenger compartment of the vehicle which acts on the second regulator 116, the aggregate 10 can be switched on as required.

A further interesting use of the aggregate 10 lies in that with the aggregate 10, where applicable in conjunction with electric and thermal solar cells or collectors, a complete energy supply of a building can be achieved. In this case the piston motor part 28 is fired with a fuel in order to drive the electric motor part 26 which in turn produces electrical energy for the building supply. Also the waste heat from the piston motor part 28 can be used for heating purposes. The electric energy to start the piston motor part 28 formed as a combustion engine can be provided for example via the power supplied by means of solar cells on the roof of the building.

With reference to FIGS. 6 to 10, a further embodiment of an aggregate 10' is now described, wherein the aggregate 10' is designed as a hybrid engine as a modification of the aggregate 10.

Those parts of the aggregate 10' which are identical or similar to corresponding parts of the aggregate 10 carry the same reference numerals as the parts of the aggregate 10 supplemented with '.

Unless specified otherwise below, the description of the aggregate 10 also applies to the aggregate 10'.

The aggregate 10' has an electric motor part 26' and a piston motor part 28' in a housing 12'.

The piston motor part 28' has two pistons with piston elements 30', 32', 34' and 36', the design of which corresponds to the piston elements 30, 32, 34 and 36 of the aggregate 10.

Piston elements 30' and 32' define a first working chamber 42' and piston elements 34' and 36' define a second working chamber 48'.

Piston elements 30' and 32' perform reciprocating motions in the housing 12' which are again executed as pivoting motions about a pivot axis 50'. Similarly piston elements 34' and 36' perform reciprocating, mutually opposing motions also as pivoting motions in relation to pivot axis 50'.

Piston elements 30' to 36' in the housing 12' revolve about a rotation axis 64' which is fixed in relation to the housing. In order to derive the reciprocating motions of the pistons from the revolving motions about the rotation axis 64', the piston motor part 28' furthermore has a curve element 66' with two control curves 68' and 70'.

The piston elements 30' and 32' are guided in the control curves 68' by means of running elements in the form of balls 72' and 74', and the piston elements 34' and 36' are guided by means of running elements in the form of balls 76' and 78' along the control curve 70' of the curve element 66'.

Piston elements 30' to 36' are mounted in sliding fashion in a piston cage 80', wherein the piston cage 80' together with piston elements 30' to 36' revolves about the rotation axis 64' in the housing 12'.

The electric motor part 26' has a stator 82' with windings 84' and magnet cores 86'. The stator 82' is arranged immobile in the housing 12'.

The electric motor part 26' furthermore has a rotor 88' which surrounds the piston motor part 28' in the manner of a ring.

In contrast to the aggregate 10, the rotor 88' is not coupled permanently rotationally fixed with a piston cage 80' of the piston motor part 28', but the rotor 88' can be coupled rotationally fixed with the piston cage 80'.

For this a coupling 140 is arranged in the housing 12' and formed as a hydraulic coupling.

Figure 7:
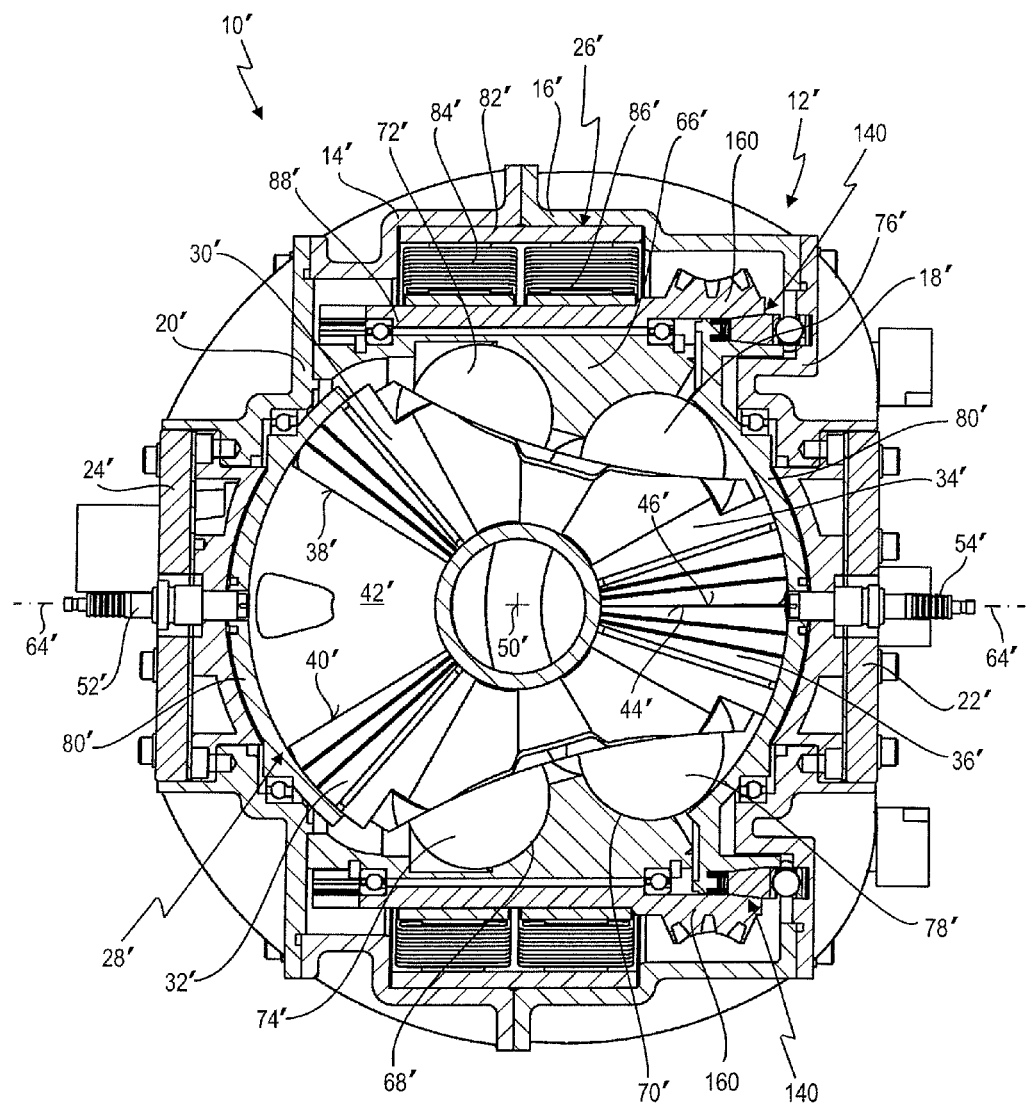
FIG. 7 shows the aggregate in FIG. 6 in a section along a plane which contains a rotation axis of a rotor of an electric motor part of the aggregate.
Figure 8:
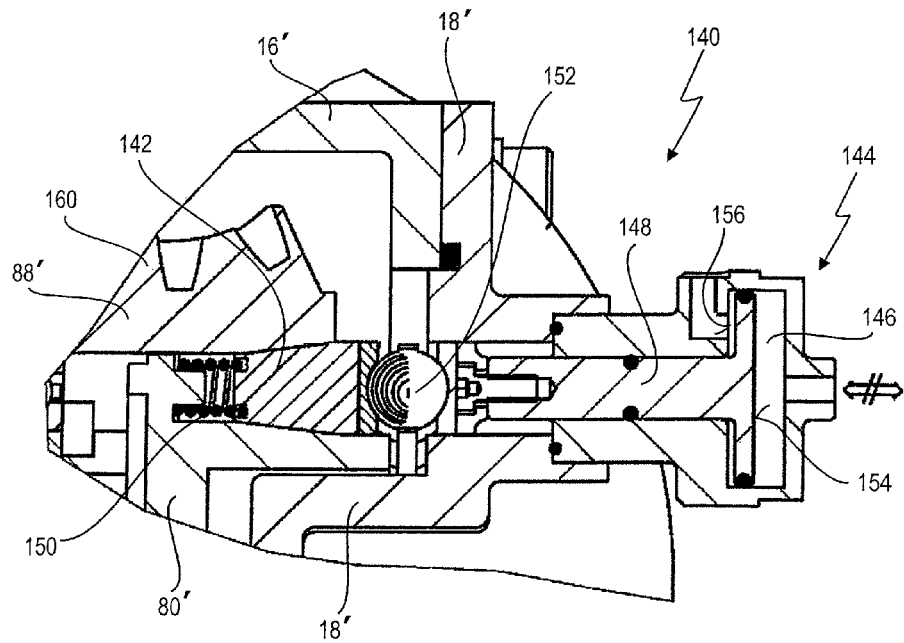
FIG. 8 shows a detail of the aggregate in FIGS. 6 and 7 in cross section in a first operating position.
Figure 9:
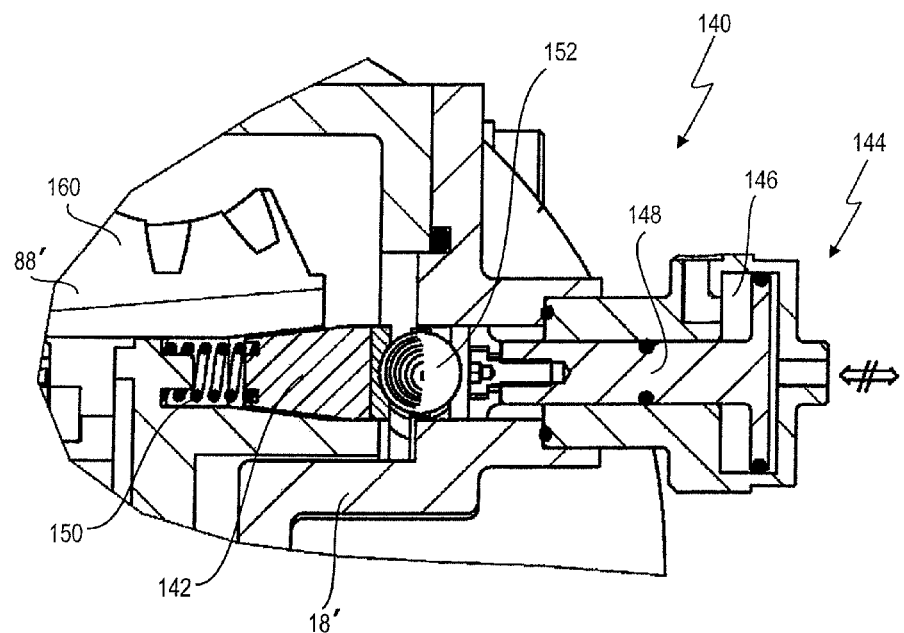
FIG. 9 shows the detail of FIG. 8 in a second operating position.

In FIGS. 8 and 9, the coupling 140 is shown alone and enlarged in relation to FIG. 7. The coupling 140 has a conical coupling ring 142 which in the closed state of the coupling 140 couples the rotor 88' rotationally fixed with the piston cage 80'. FIG. 8 shows the closed position of the coupling 140 and FIG. 9 the open position of the coupling 140 in which the rotor 88' is not coupled rotationally fixed with the piston cage 80'.

Distributed about the rotation axis 64' in the peripheral direction, the coupling 140 has several, for example six (see FIG. 6), hydraulic drives 144 with a hydraulic cylinder 146 and a hydraulic piston 148.

A compression spring 150 pretensions the coupling ring 142 in its open position as shown in FIG. 9.

The coupling ring 142 is mounted in rotatable fashion via a ring ball bearing 152 in the rotary direction about the rotation axis 64' on the housing 12', more precisely on the bottom part 18'.

By applying a hydraulic pressure on a surface 154 of the hydraulic piston 148, the hydraulic piston 148 acts on the coupling ring 142 and moves this into the closed position so that the rotor 88' is coupled rotationally fixed with the piston cage 80'. By applying hydraulic pressure to the piston 148' against a surface 156 opposite surface 154, the piston 148 is moved to the right in FIG. 9, whereby the compression spring 150 moves the coupling ring 142 out of its closed position into its open position so that the rotor 88' is no longer coupled rotationally fixed with the piston cage 80'.

Figure 10:
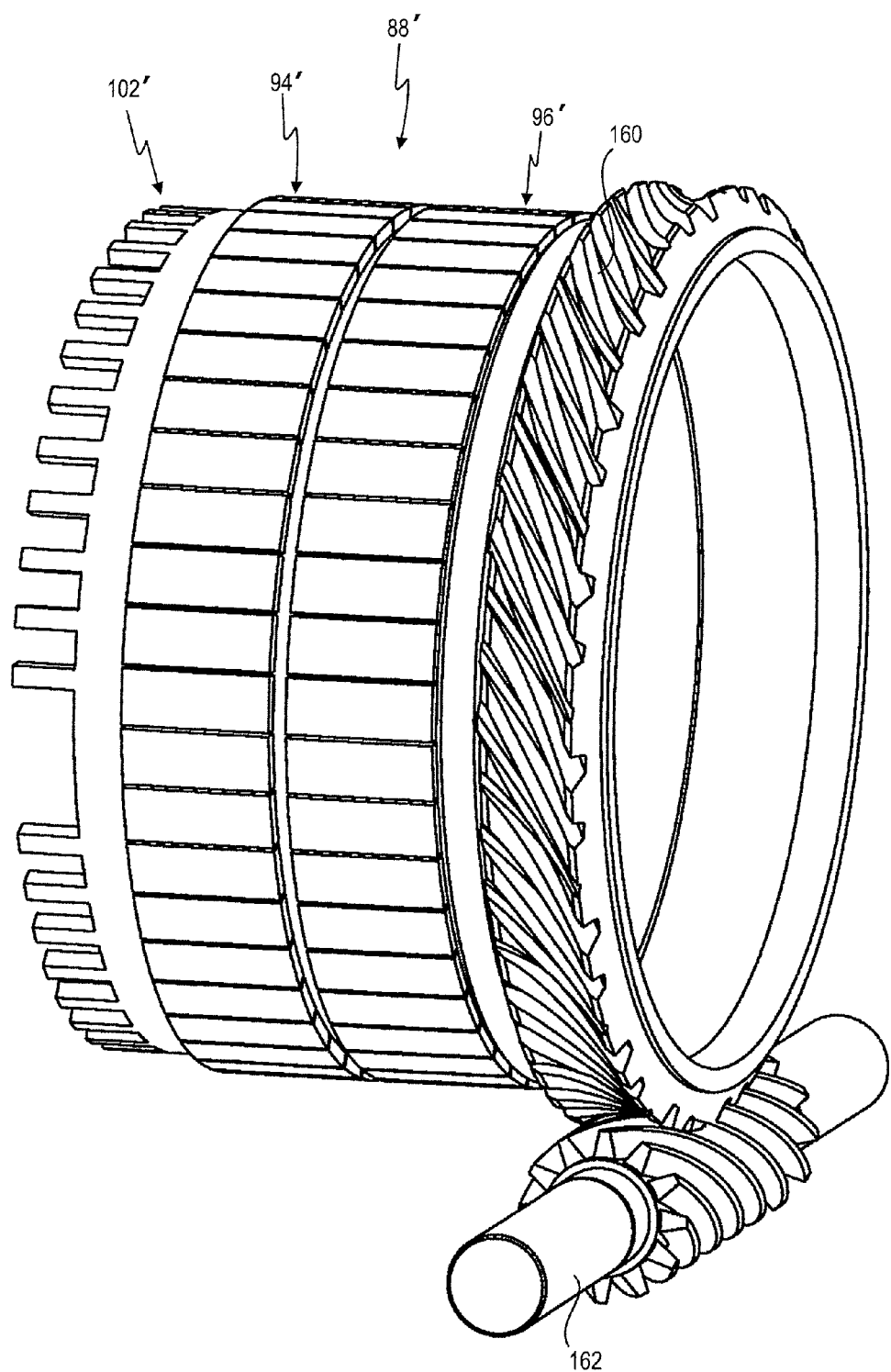
FIG. 10 shows the rotor of the electric motor part of the aggregate in FIGS. 6 and 7 together with a drive/output shaft in perspective view.
Figure 10A:
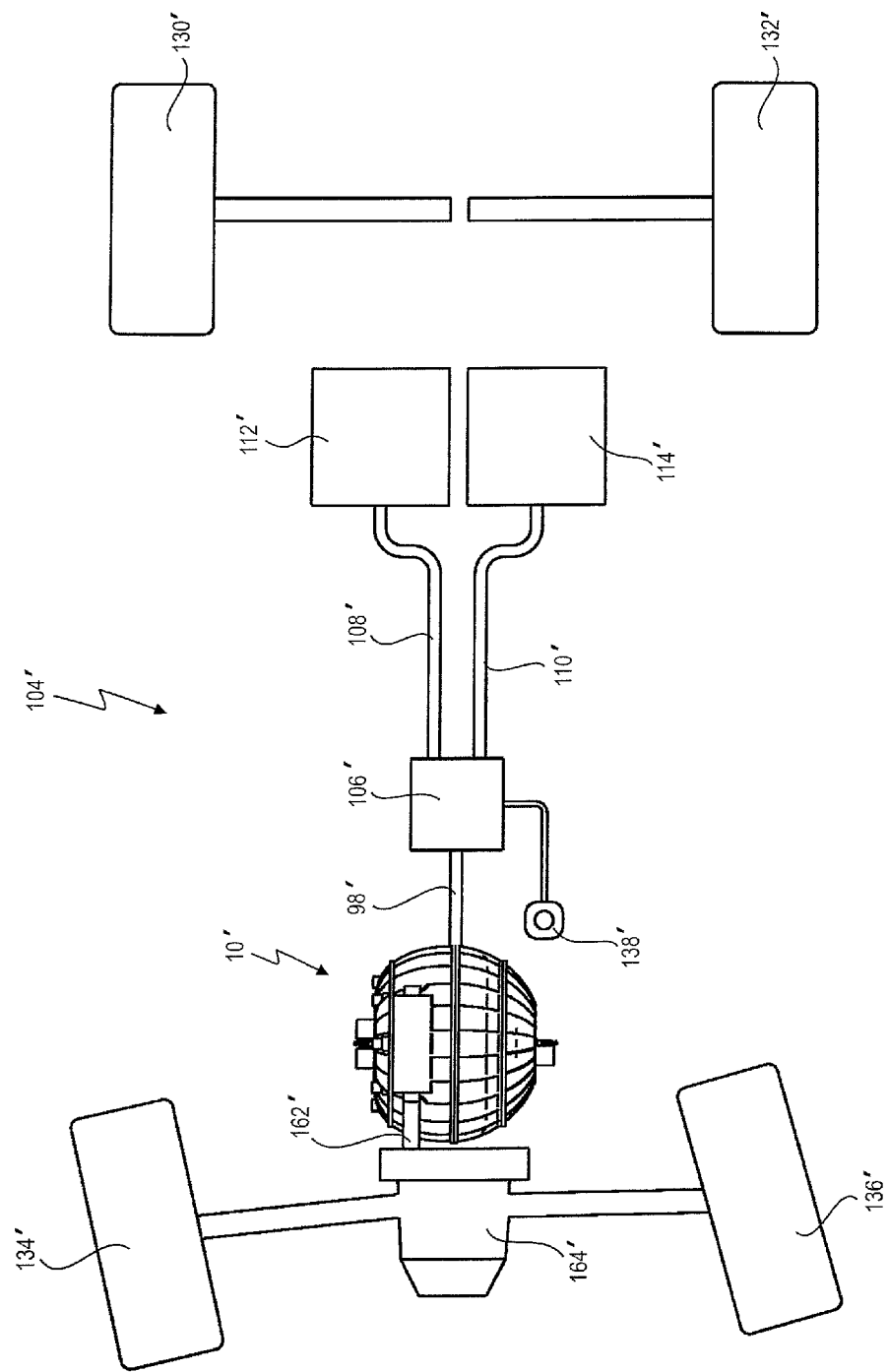
FIG. 10A shows a diagram of an example for installation of the aggregate in FIGS. 6 and 7 in a chassis of a vehicle.
Figure 11:
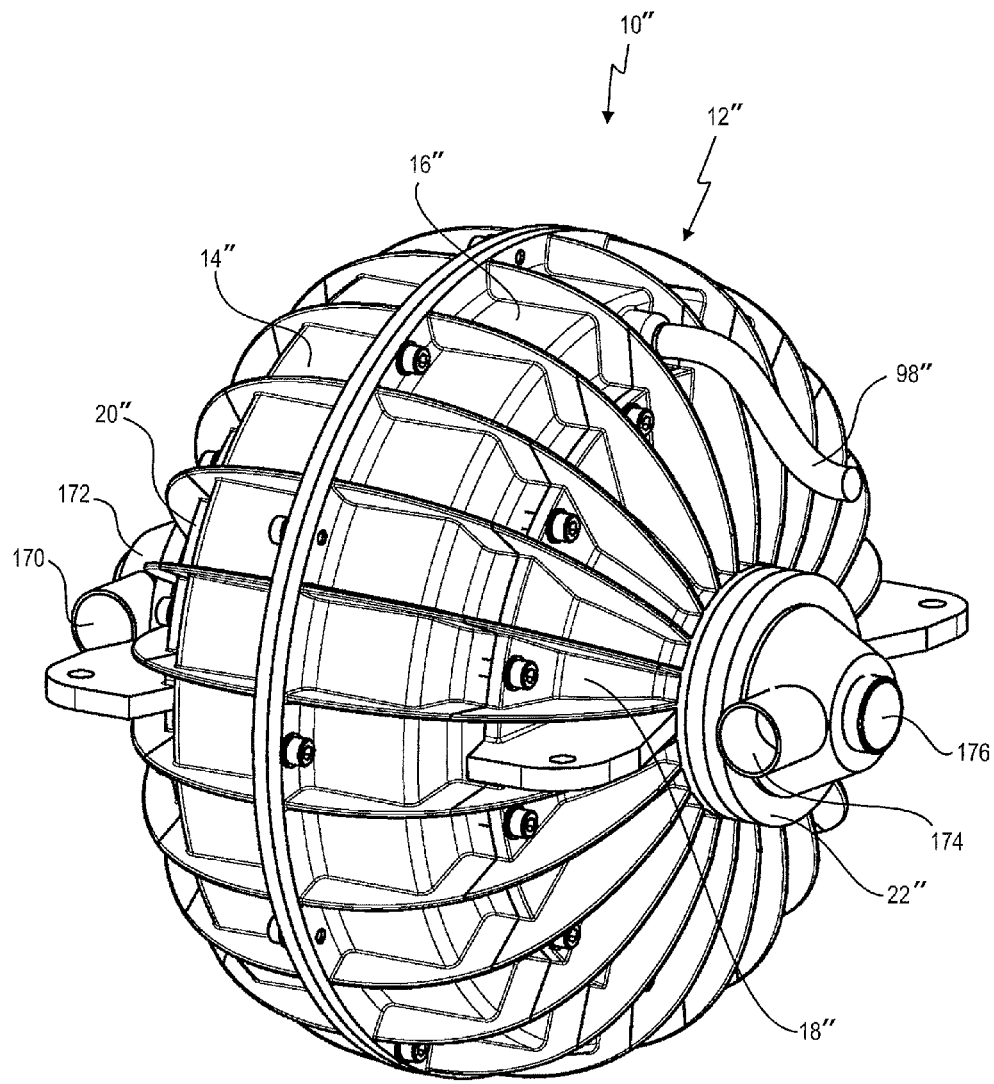
FIG. 11 shows a third embodiment of an aggregate in a configuration as a compressor in a perspective view with a closed housing.

According to a further aspect, the rotor 88' is fitted with a crown gear 160 with oblique toothing which extends about the rotation axis 64', as shown in particular in FIG. 10, which shows the rotor 88' with the magnet rings 94' and 96'. Also FIG. 10 shows the "60-2" crown gear 102' of the control sensor 100' for the engine management of the piston motor part 28'.

Crown gear 160 of rotor 88' meshes with a drive/output shaft 162.

When coupling 140 is closed, the piston cage 80' is thus coupled with the drive/output shaft 162 so that the revolving motion of the piston cage 80' is converted into a rotary motion of the drive/output shaft 162.

When the aggregate 10' is working as an electric motor, coupling 140 is opened so that only the rotor 88' is now coupled with the drive/output shaft 162.

When the coupling 140 is closed, the electric motor part 26' functions as an electrical power generator to charge the vehicle batteries.

FIG. 10 shows an example of an installation position of the aggregate 10' in a chassis 104' of a vehicle. The aggregate 10' is connected via the drive/output shaft 162 with a gear mechanism 164 in order to drive the wheels 134' and 136' of the vehicle via the gear mechanism 164. Secondly the aggregate 10' is connected via a cable 98' with a regulator 106', wherein the regulator 106' is connected with accumulators 112' and 114' via cables 108' and 110'.

The aggregate 10' which is formed as a hybrid engine can thus drive the wheels 134' and 136' in the conventional manner via the piston motor part 28' which is formed as a combustion engine, and also the aggregate 10' as an electric motor can drive the wheels 134' and 136' by the electric motor part 26' via the drive/output shaft 162. Secondly in operation of the aggregate 10' solely as a combustion engine, via the electric motor part 26' the accumulators 112' and 114' i.e. the vehicle batteries can be charged.

Via a control element 138' the various operating modes of the aggregate 10' can be switched on or put into operation.

In addition to the use described above of the aggregate 10' in a motor vehicle, aggregate 10' can also be used for simultaneous or alternate production of electrical energy and compressed air, wherein then the electric motor part 26' and the piston motor part 28' are driven by wind energy. In this application, the drive/output shaft 162 is mechanically connected with a wind wheel. Via the drive/output shaft 162 when coupling 140 is closed, the wind wheel drives the piston cage 80' whereby the piston motor part 28' generates compressed air in the manner of a compressor. At the same time, when coupling 140 is closed, the rotor 88' is set in rotation so that the electric motor part 26' generates electricity. The piston motor part 28' is not fired in this application so that spark plugs are omitted.

When coupling 140 is opened, via the drive/output shaft 162 only the electric motor part 26' is driven, which then generates electricity, while the piston motor part 28' has stopped.

With reference to FIGS. 11 to 14, a further embodiment of an aggregate 10" is described below, wherein the aggregate 10" is designed as a compressor.

Those parts of the aggregate 10" which are identical or similar to corresponding parts of the aggregate 10 carry the same reference numerals as the parts of the aggregate 10 supplemented by ".

Unless specified otherwise below, the description of the aggregate 10 also applies to the aggregate 10".

The aggregate 10" comprises in a housing 12" an electric motor part 26" and a piston motor part 28".

The piston motor part 28" is described in more detail below.

The piston motor part 28" has a total of two pistons with piston elements 30", 32", 34" and 36". Piston elements 30" and 34" are rigidly connected together and form a first piston, and piston elements 32" and 36" are also rigidly connected together and form a second piston.

Piston elements 30" and 32" in the housing 12" perform reciprocating motions in opposition to each other, which are executed as pivoting motions about a pivot axis 50". Similarly piston elements 34" and 36" also perform reciprocating movements in opposition to each other about pivot axis 50".

Figure 12:
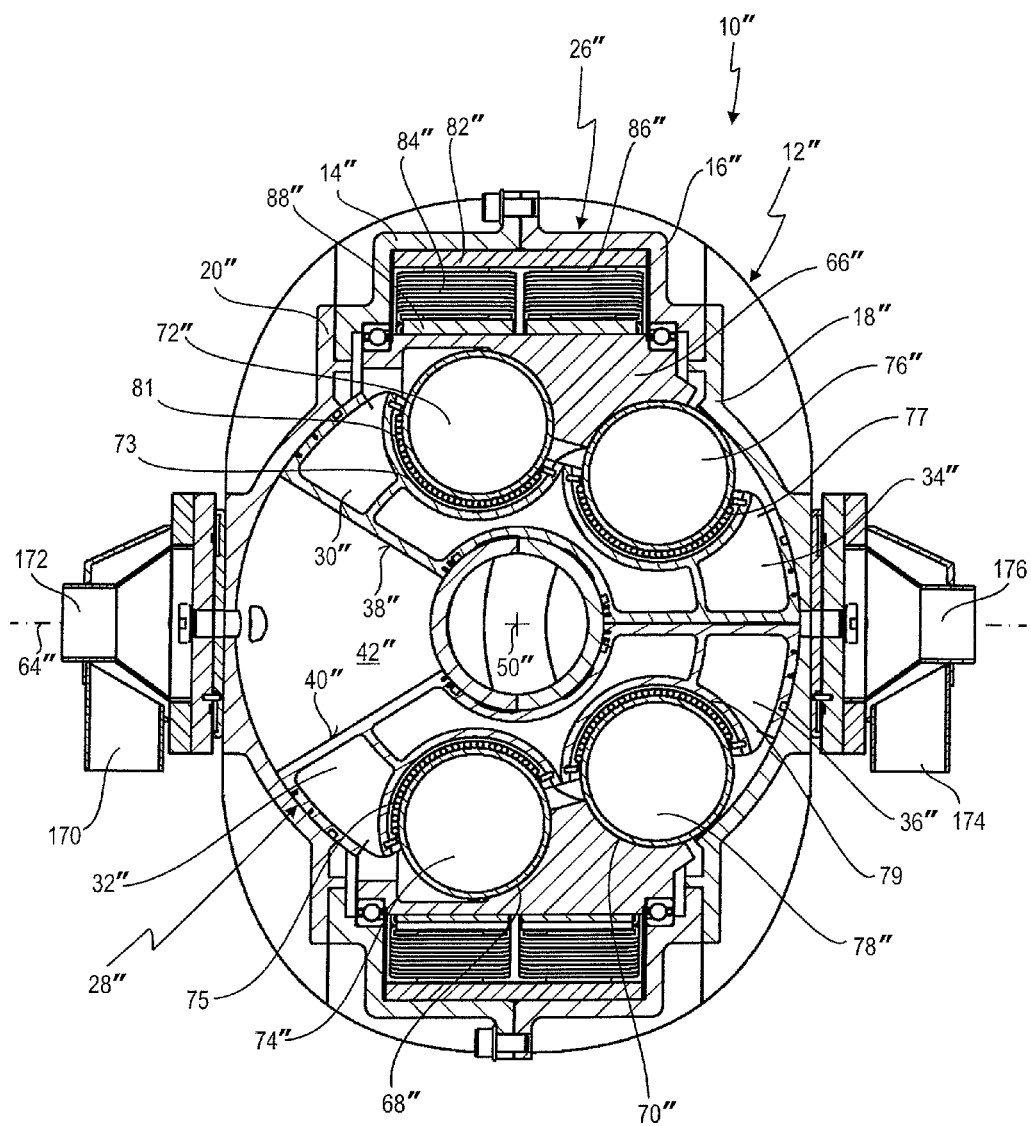
FIG. 12 shows the aggregate in FIG. 11 in a section along a plane containing a rotation axis of the rotor of an electric motor part of the aggregate, wherein pistons of a piston motor part of the aggregate are shown in a first position.
Figure 13:
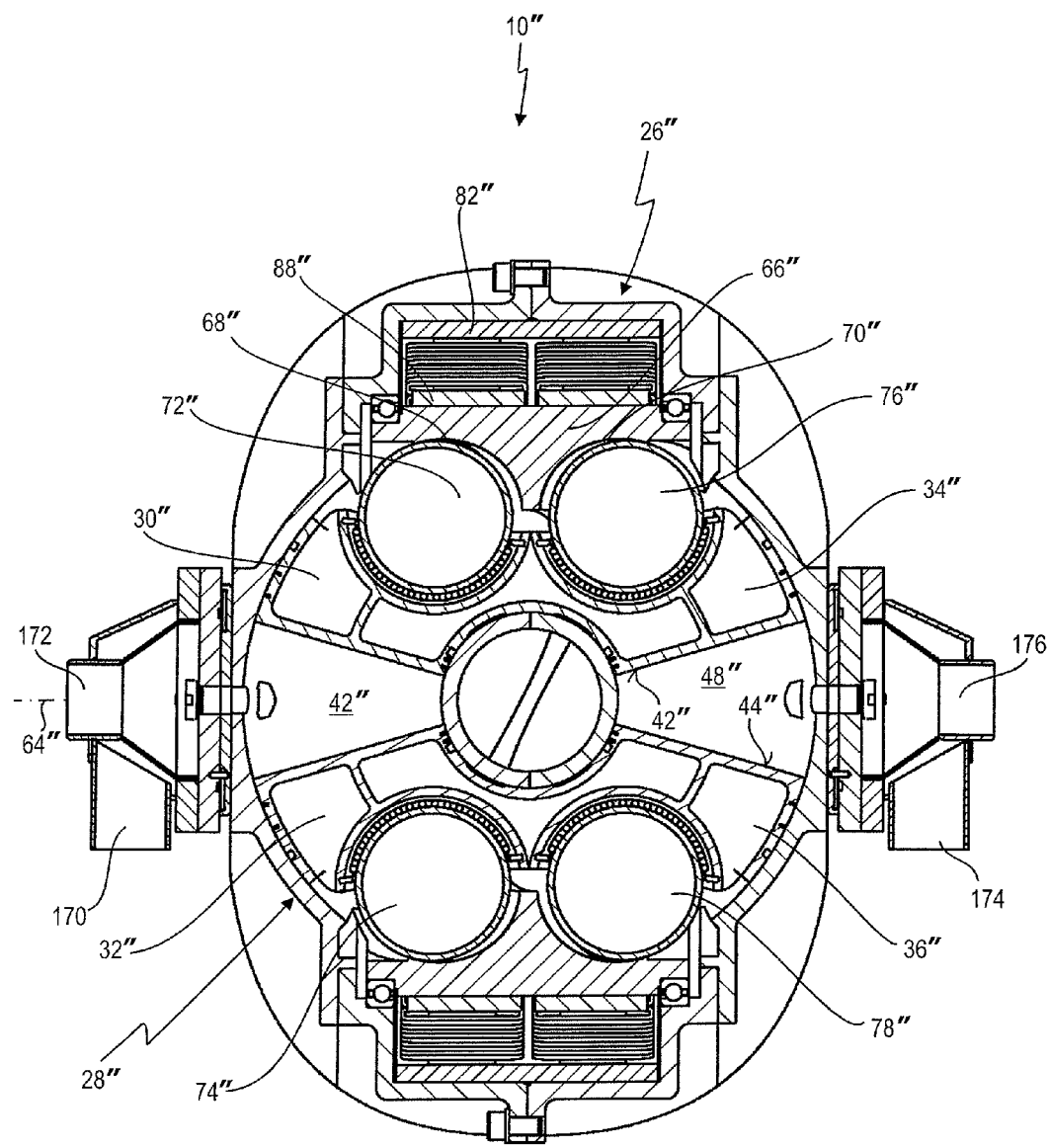
FIG. 13 shows the aggregate in FIGS. 11 and 12 in a section along a plane which contains the rotation axis of the rotor of the electric motor part, wherein the pistons are shown in a second position.
Figure 14:
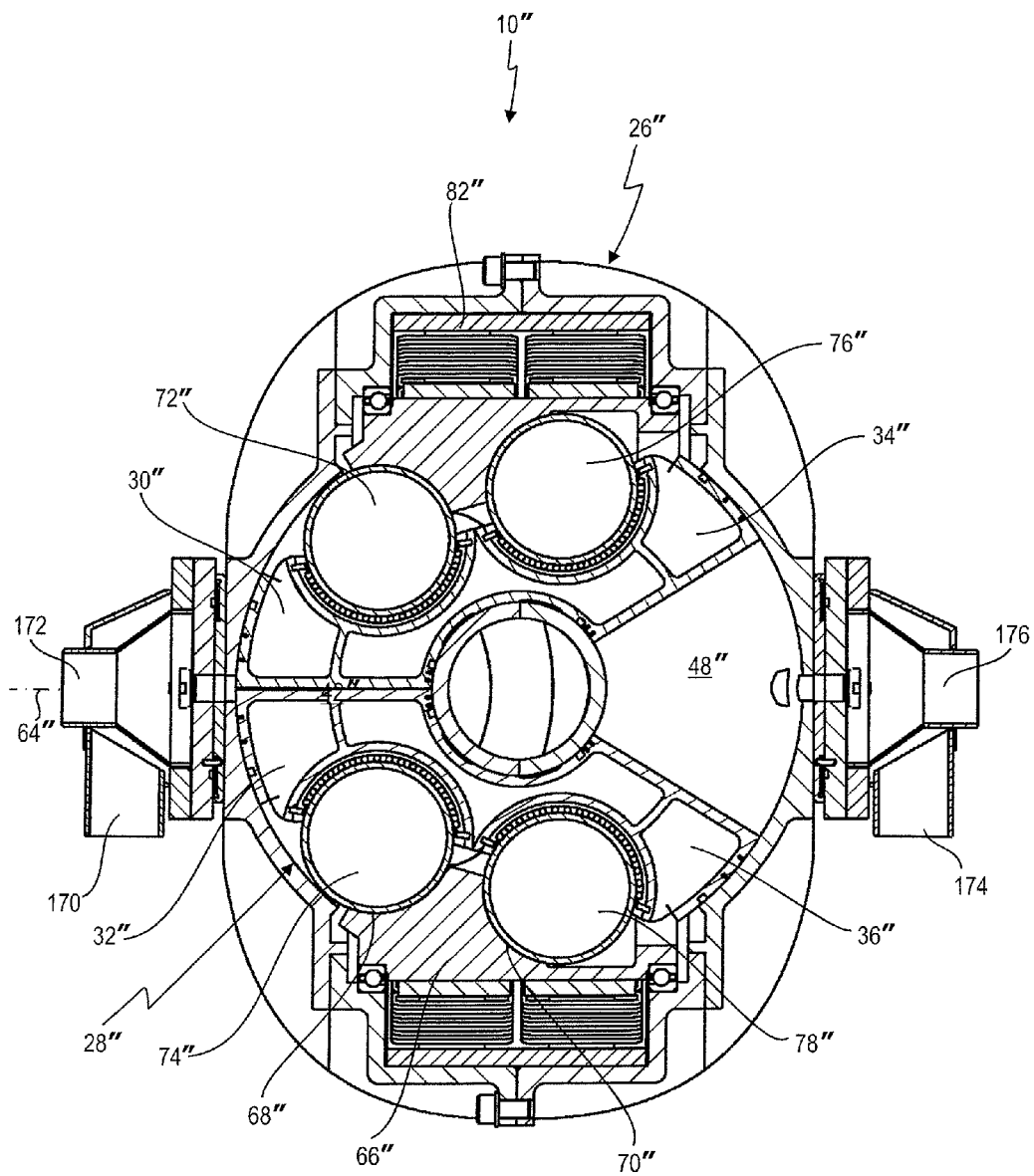
FIG. 14 shows the aggregate in FIGS. 11 to 13 in a section along a plane which contains the rotation axis of the rotor of the electric motor part, wherein the pistons are shown in a third position.

In contrast to the aggregate 10 and the aggregate 10', the pistons do not revolve about a rotation axis 64" in the housing but perform said reciprocating motions always in the same plane, here in the drawing plane in FIGS. 12 to 14, so that the housing 12" in FIGS. 12 to 14 is always shown in the same orientation. Also the piston motor part 28" does not have a piston cage but the pistons are arranged directly in the housing 12" lying against its inner wall.

Piston elements 30" and 32" here define a working chamber 42" and piston elements 34" and 36" define a further working chamber 48".

In the working chambers 42" and 48" in the aggregate 10", no strokes of a Carnot cycle are performed but in the working chambers 42" a gas, for example air, is drawn in and then compressed and then expelled again as compressed gas. The piston motor part 28" thus works not as a combustion engine but as a compressor.

Accordingly in the aggregate 10" a gas inlet 170 and a compressed gas outlet 172 are allocated to the working chamber 42". A gas inlet 174 and a compressed gas outlet 176 are also allocated to the working chamber 48". To control the gas change, the gas inlets 170, 174 and the compressed gas outlets 172 have for example flutter valves.

To generate the reciprocating motions of the pistons, the piston motor part 28" has a curve element 66" comprising two control curves 68" and 70". Allocated to each of the piston elements 30" to 36" is a running element in the form of a ball 72", 74", 76" and 78", wherein the balls 72" to 78" are formed as hollow balls. The balls 72" to 78" are received in corresponding ball sockets 73 (piston element 30"), 75 (piston element 32"), 77 (piston element 34") and 79 (piston element 78"), shown here, on the back of the piston elements 30" to 36" facing away from the working chambers 42" and 48". As shown here, the ball sockets 73, 75, 77, 79 have ball bearings wherein the ball bearing of the ball socket 73 in FIG. 12 is marked with reference numeral 81.

In contrast to the curve elements 66 and 66' of the aggregate 10 and 10', the curve element 66" is configured to revolve about the rotation axis 64". The revolution of the curve element 66" around the rotation axis 64" generates the reciprocating motions of the pistons.

The electric motor part 26" of the aggregate 10" has a stator 82" and a rotor 88" which in this embodiment example carries windings 84" and magnet cores 86".

To drive the curve element 66" about the rotation axis 64", the rotor 88" of the electric motor part 26" is connected rotationally fixed with the curve element 66".

The electric motor part 26" here serves as an electric motor to drive the piston motor part 28", so that with the aggregate 10" a compressor is created which requires no external motor as a drive. Rather the drive motor in the aggregate 10" is integrated in the housing 12".

Whereas the working chamber 42" in FIG. 12 assumes its maximum volume and the working chamber 48" its minimum volume, FIG. 13 shows a position of the pistons in which the volume of the working chamber 42" has reduced in relation to FIG. 12 and the volume of the working chamber 48" has enlarged, whereas FIG. 14 finally shows the state in which the working chamber 42" assumes its minimum volume and the working chamber 48" its maximum volume. This aspirating movement of the working chambers 42" and 48" draws fresh gas into the working chambers 42" and 48" respectively, then compresses it and expels it as compressed gas.

In all the embodiment examples of the aggregate 10, 10' and 10" described above, the balls 72 to 78 or 72' to 78' or 72" to 78" are mounted in the associated ball sockets so that when running along the control curves 68, 70 or 68', 70' or 68", 70" the balls are not under shear stress but the force lines always run centrally through the balls and the associated ball sockets and the control curves.

Figure 15:
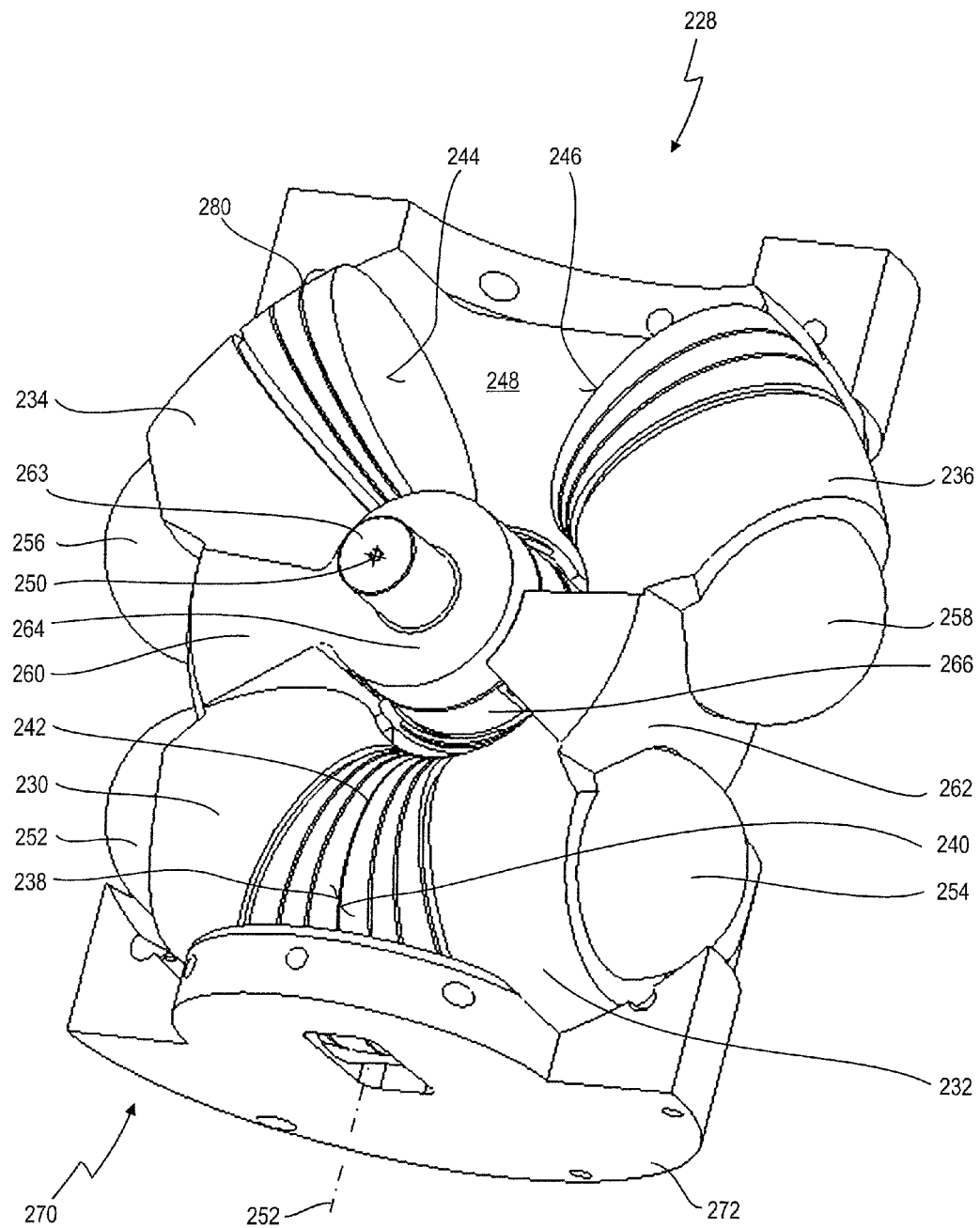
Figure 16:
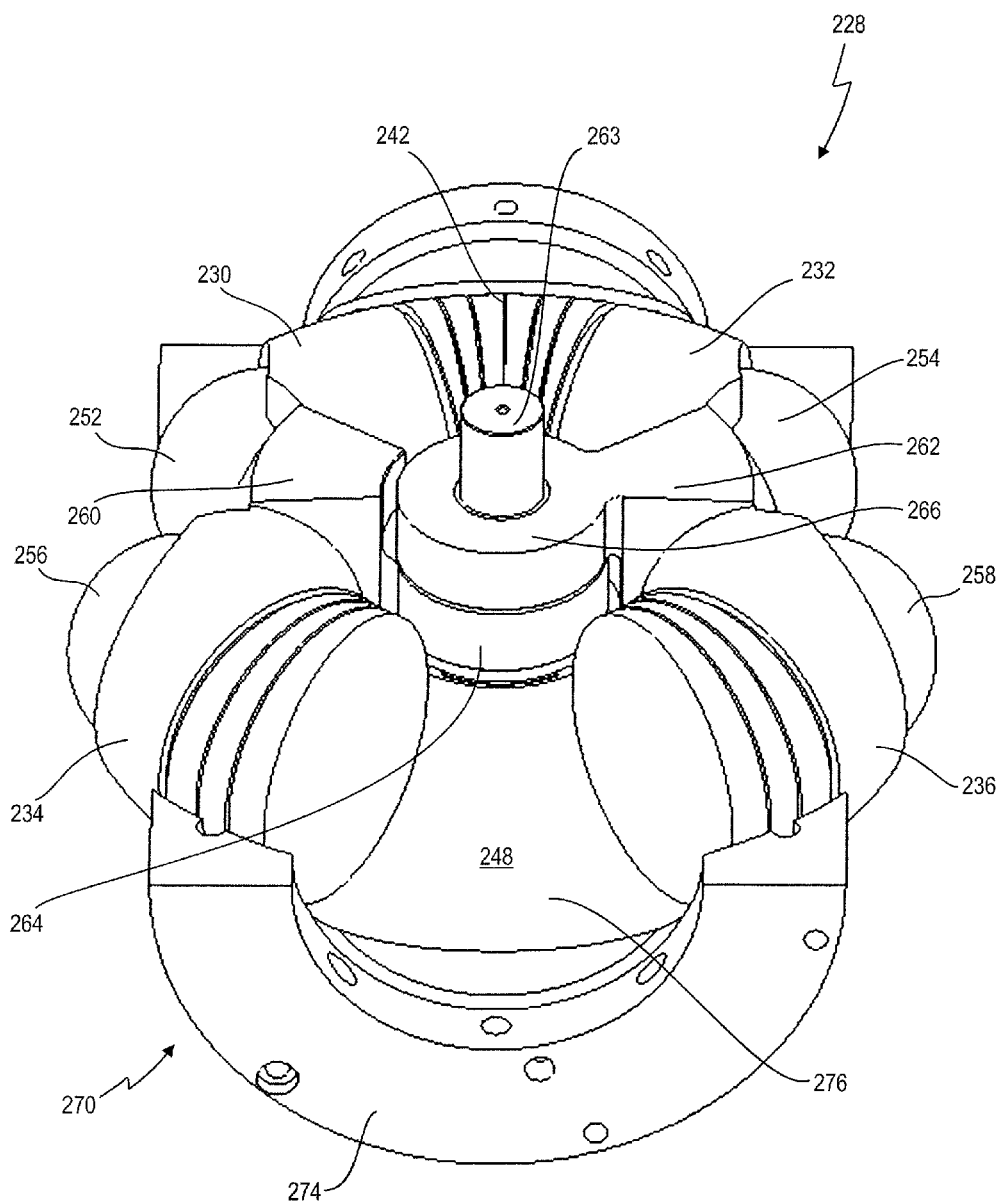
FIG. 16 shows the piston motor part in FIG. 15, wherein a second half of the piston cage of the piston motor part is removed.
Figure 17:
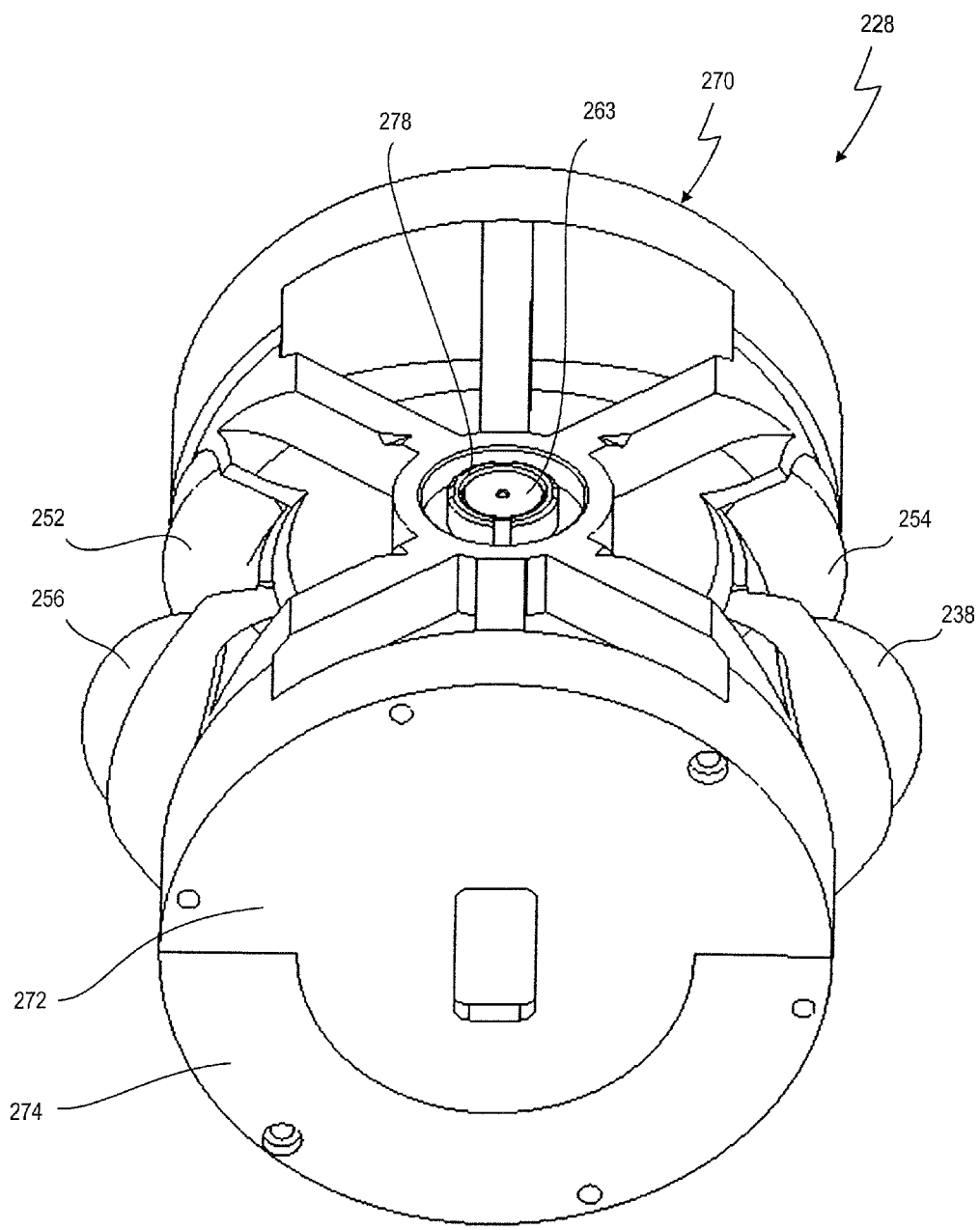
FIG. 17 shows the piston motor part in FIGS. 15 and 16, wherein the two halves of the piston cage of the piston motor part are shown joined together.

In FIGS. 15 to 17 a further embodiment of a piston motor part 228 is shown. The piston motor part 228 can be used without or with slight constructional adaptations instead of the piston motor part 28 in the aggregate 10, instead of the piston motor part 28' in the aggregate 10' or instead of the piston motor part 28" in the aggregate 10".

According to FIGS. 15 and 16, the piston motor part 228 has a first piston with piston elements 230 and 234, and a second piston with piston elements 232 and 236.

The first piston element 230 has a first end face 238 and the second piston element 232 has a second end face 240 between which a working chamber 242 is defined, which assumes its minimum volume in the position shown in FIGS. 15 and 16 of the piston elements 230 and 232. The third piston element 234 has a third end face 244 and the fourth piston element 236 has a fourth end face 246 which define between them the second working chamber 248. In the position of piston elements 234 and 236 shown in FIGS. 15 and 16, the working chamber 248 assumes its maximum volume.

The pistons are pivotable about a common pivot axis 250, wherein the pivoting motions of the pistons are derived from the revolving motions of the pistons about a rotation axis 252 perpendicular to the pivot axis 250. The pivot axis 250 here revolves about the rotation axis 252 together with the pistons as described already above with reference to the piston motor part 28, 28'. The pivoting motions are controlled as in the previous embodiment examples via running elements which are formed as balls 252 (piston element 230), 254 (piston element 232), 256 (piston element 234) and 258 (piston element 236). The balls 252, 254, 256, 258 here run in control curves not shown, as already described above with reference to the piston motor parts 28, 28', 28".

As in the previous embodiments, the first piston element 230 is rigidly connected with the third piston element 234 via a bridging segment 260, and the second piston element 232 is rigidly connected with the fourth piston element 236 by a further bridging segment 262. Thus the pivoting motions of the first piston element 230 and the third piston element 234 take place in the same direction about the pivot axis 250, and the pivoting motions of the second piston element 232 and the fourth piston element 236 also take place in the same direction with respect to each other. The pivoting motions of the first piston element 230 and the second piston element 232 are correspondingly opposite to each other, as are the pivoting motions of the third piston element 234 and the fourth piston element 236.

In contrast to the previous embodiments, the pistons are held and mounted on a journal 263 on the pivot axis 250. The journal 263 can be formed as a hollow journal.

To mount the pistons on the pivot axis 250 (journal 263), at the bridging segments 260 and 262 are arranged bearing eyes 264 (bridging segment 260) and 266 (bridging segment 262) which are formed preferably as one piece with the rest of the bridging segment 260 or 262. The bearing eyes 264 and 266 are mounted on the journal 263 rotatable about the pivot axis 250.

The bearing eyes 264 and 266 can be mounted on the journal 263 by means of plain bearings, needle roller bearings or ball bearings.

The piston element pairs 230, 234 and 232, 236 as in the previous embodiment examples are held in a piston cage 270 which according to FIG. 17 consists of two halves 272 and 274, wherein FIG. 15 shows only the half 272 and FIG. 16 only the half 274 of the piston cage 270. The two halves 272 and 274 of the piston cage 270 on the inside form arcuate guide shells adapted to the outer contour of the piston elements 230, 232, 234 and 236, of which guide shells only one can be seen in FIG. 16, marked with reference numeral 276.

According to FIG. 17, the piston cage on the outside has a bearing eye 278 (in FIG. 17, only one of these bearing eyes can be seen) in which the journal 263 is held.

The design of the piston motor part 228 has the advantage that the pistons can perform their pivoting motions about the pivot axis 250 in the piston cage 270 substantially without wall sliding friction, so that only the piston rings (for example 280 on piston 234) have contact with the guide shells 276 in the piston cage 270. This reduces friction and the associated heat development, and reduces the wear.

In the case that the piston cage 270 rotates about the rotation axis 252, centrifugal forces acting on the pistons are absorbed by the journals 263 and the bearing eyes 264, 266 and do not lead to increased piston friction in the guide shells 276 in the piston cage 270.

As already stated, the piston motor part 228 can be used in the aggregate instead of the piston motor part 28. In this case, when the aggregate 10 is used as a so-called range extender, the curve element 68 is firmly connected with the housing 12. The piston cage 270 of the piston motor part 228 is then firmly connected with the rotor 88 of the electric motor part 26 and rotates together with this. The same applies when the piston motor part 228 is used instead of the piston motor part 28' in the aggregate 10'.

In the case where the piston motor part 228 is used instead of the piston motor part 28" in the aggregate 10", the curve element 66" is not fixed to the housing but designed revolving about rotation axis 64". In this case the piston cage 270 of the piston motor part 228 is also formed as a stator.

The invention claimed is:

1. An aggregate, comprising
a housing,
a piston motor part arranged in the housing, the piston motor part having
a first piston having a first end face, and
a second piston having a second end face,
wherein the first piston and the second piston perform reciprocating motions,
a working chamber for a working medium which is arranged between the first end face and the second end face, and which is periodically reduced and enlarged in size because of the reciprocating motions of the pistons,
an electric motor part arranged in the housing, the electric motor part having
an annular rotor which rotates in the housing about a rotation axis that is fixed relative to the housing, wherein the rotor surrounds the piston motor part; and
wherein the first piston and the second piston do not revolve about the rotation axis, and further comprising a curve element configured as a ring and surrounding the first and the second piston, the curve element having a control curve, wherein the curve element revolves about the rotation axis, wherein the first piston and the second piston each have at least one running element which is guided along the control curve on revolution of the curve element about the rotation axis, and the rotor is fixedly connected with the curve element.

2. The aggregate of claim 1, further comprising a drive/output shaft, wherein the rotor is connected with the drive/output shaft.

3. The aggregate of claim 1, wherein the at least one running element of the first piston and the at least one running element of the second piston being configured as a ball in each case, which is mounted freely rotatable in a respective ball socket on a respective back of the first and the second piston facing away from the first and second end faces respectively.

4. The aggregate of claim 1, wherein the first piston further has a third end face and the second piston further has a fourth end face, a further working chamber being arranged between the third end face and the fourth end face, wherein the further working chamber periodically reduces and enlarges in size because of the reciprocating motions of the first and second pistons.

5. The aggregate of claim 4, wherein the first piston has a first element having the first end face and a third element having the third end face and the second piston has a second element having the second end face and a forth element having the fourth end face, the first and third elements are fixedly connected together and the second and fourth elements are fixedly connected together so that the working chamber and the further working chamber reduce and enlarge in size in opposition to each other.

6. The aggregate of claim 1, wherein the piston motor part has a pivot axis, wherein the reciprocating motions of the first and second pistons are pivoting motions about the pivot axis, and the first piston and the second piston are supported on a journal centered on the pivot axis.

7. The aggregate of claim 1, wherein the aggregate is a hybrid engine.

8. The aggregate of claim 1, wherein the aggregate is an electric power generator.

9. The aggregate of claim 1, wherein the aggregate is a compressor.

10. An aggregate, comprising
a housing,
a piston motor part arranged in the housing, the piston motor part having
a first piston having a first end face, and
a second piston having a second end face,
wherein the first piston and the second piston perform reciprocating motions,
a working chamber for a working medium which is arranged between the first end face and the second end face, and which is periodically reduced and enlarged in size because of the reciprocating motions of the pistons,
an electric motor part arranged in the housing, the electric motor part having
an annular rotor which rotates in the housing about a rotation axis that is fixed relative to the housing, wherein the rotor surrounds the piston motor part; and
wherein the first piston and the second piston do not revolve about the rotation axis, and further comprising a curve element configured as a ring and surrounding the first and the second piston, the curve element having a control curve, wherein the curve element revolves about the rotation axis, wherein the first piston and the second piston each have at least one running element which is guided along the control curve on revolution of the curve element about the rotation axis, and the rotor can be coupled rotationally fixed with the curve element and can be decoupled from the curve element.

\* \* \* \* \*